US008359273B2

(12) United States Patent
Leleu

(10) Patent No.: US 8,359,273 B2
(45) Date of Patent: Jan. 22, 2013

(54) SECURED AUTHENTICATION METHOD FOR PROVIDING SERVICES ON A DATA TRANSMISSON NETWORK

(76) Inventor: Jean-luc Leleu, Paris (FR)

( * ) Notice: Subject to any disclaimer, the term of this patent is extended or adjusted under 35 U.S.C. 154(b) by 1349 days.

(21) Appl. No.: 11/659,836

(22) PCT Filed: Aug. 5, 2005

(86) PCT No.: PCT/FR2005/002034
§ 371 (c)(1),
(2), (4) Date: May 9, 2007

(87) PCT Pub. No.: WO2006/021661
PCT Pub. Date: Mar. 2, 2006

(65) Prior Publication Data
US 2008/0176533 A1  Jul. 24, 2008

(30) Foreign Application Priority Data

Aug. 10, 2004   (FR) ...................... 04 08797

(51) Int. Cl.
*G06F 21/00* (2006.01)
*H04L 9/32* (2006.01)
(52) U.S. Cl. .............. 705/59; 705/66; 705/67; 705/902; 713/172
(58) Field of Classification Search .................... 705/64, 705/59
See application file for complete search history.

(56) References Cited

U.S. PATENT DOCUMENTS

| 5,153,919 A * | 10/1992 | Reeds et al. ..................... 380/44 |
| 5,970,144 A * | 10/1999 | Chan et al. ..................... 380/247 |
| 6,760,841 B1 | 7/2004 | Fernandez |
| 7,035,410 B1 * | 4/2006 | Aiello et al. ................... 380/247 |
| 7,181,017 B1 * | 2/2007 | Nagel et al. ..................... 380/282 |
| 7,430,606 B1 * | 9/2008 | Meandzija et al. ............ 709/229 |
| 7,721,109 B1 * | 5/2010 | Herder ........................... 713/186 |
| 2002/0018569 A1 * | 2/2002 | Panjwani et al. .............. 380/247 |
| 2003/0005300 A1 * | 1/2003 | Noble et al. ..................... 713/172 |
| 2003/0014315 A1 | 1/2003 | Jaalinoja et al. |
| 2003/0037261 A1 * | 2/2003 | Meffert et al. ................. 713/201 |
| 2003/0061170 A1 | 3/2003 | Uzo |
| 2004/0029562 A1 * | 2/2004 | Sharon et al. .................. 455/410 |
| 2004/0073801 A1 * | 4/2004 | Kalogridis et al. ........... 713/176 |
| 2004/0176071 A1 * | 9/2004 | Gehrmann et al. ........... 455/411 |

(Continued)

OTHER PUBLICATIONS

Mendez, Vanstone, Oorschot: "Handbook of Applied Cryptography", 1997, CRC Press LLC. USA, XP002319872 p. 15-16 p. 24-26 p. 33 p. 405-410 p. 494 p. 548-549 p. 577-580.

*Primary Examiner* — James Kramer
*Assistant Examiner* — C. Aaron McIntyre
(74) *Attorney, Agent, or Firm* — Young & Thompson

(57) ABSTRACT

A method for accessing a service on a network, via a user terminal (30), includes a subscription phase wherein:
a container is generated, including a first set of authentication data for accessing the service and a second set of useful data relating to access rights to the service the first and second sets of data being encrypted,
the container is transmitted securely from the user terminal,
and an access phase wherein:
the container is transmitted securely from the terminal to a management server connected to the network, during a request for access,
after decryption of the constituent data of the container, the server verifies the validity of the first set of data and, in the event that verification is successful, authorizes access to the service for its execution, based on the access rights.

13 Claims, 2 Drawing Sheets

U.S. PATENT DOCUMENTS

| | | | |
|---|---|---|---|
| 2004/0181667 A1* | 9/2004 | Venters et al. | 713/164 |
| 2004/0225878 A1* | 11/2004 | Costa-Requena et al. | 713/150 |
| 2005/0004873 A1* | 1/2005 | Pou et al. | 705/51 |
| 2005/0010790 A1* | 1/2005 | Lang et al. | 713/193 |
| 2005/0050330 A1* | 3/2005 | Agam et al. | 713/172 |
| 2005/0138398 A1* | 6/2005 | Hansen | 713/189 |

* cited by examiner

SECURED AUTHENTICATION METHOD FOR PROVIDING SERVICES ON A DATA TRANSMISSON NETWORK

This invention relates in a general way to the field of authentication on a data transmission network and, in particular, relates to a method for accessing a service on a data transmission network by means of a user terminal connected to the network.

Within the meaning of this invention, a service can designate any exchange of information via a digital or telecommunication data transmission network, either between two or more users, or between a user and a service provider.

The services provided on digital data transmission networks such as the Internet have developed considerably. In particular, those relating to voice services over IP, wherein the data forming the digitized voice is then transported in the form of information packets, according to the IP protocol, have seen their development potential further strengthened by the deployment of local wireless networks, such as networks using wireless transmission technology based on the wireless radio standard 802.11 and its updates grouped together under the name Wifi (for "Wireless Fidelity").

The arrival on the market of mobile terminals equipped with means for establishing a wireless connection to the Internet, via a Wifi access network for example, renders the emergence of voice services over IP all the more significant.

However, one of the disincentives that currently limits the implementation of such services on this type of network lies in the strong security requirement that must be associated with transactions carried out, in particular for authenticating the users subscribed to the service and as concerns the integrity of the data.

The security mechanisms being used lead to intense and complex management of the authorisations that make it possible to grant or not grant permission to access the service, in this case to make a call from a telephony service over IP subscribed to by an operator.

The purpose of this invention is to propose a heavy-duty authentication system, which is very easy to put into place, and which is capable of being implemented on inexpensive user terminals having limited computing resources for accessing services, particularly services of the voice over IP type, on a data transmission network.

With this objective in view, the object of the invention is a method for accessing a service on a data transmission network, by means of a user terminal connected to said network, characterised in that it includes a phase for subscribing to said service, wherein:
  an information container associated with the user is generated, including a first set of authentication data for accessing the service and a second set of useful data relating to said user and to access rights to said service, said first and second sets of data being encrypted, and wherein
  said container is transmitted securely on said user terminal, and a phase for accessing said terminal wherein
  said container is transmitted securely from said user terminal to at least one management server connected to the network during a request to access said service, and wherein
  after decryption of the constituent data of said container, the server verifies the validity of said first set of authentication data and, in the event that verification is successful, authorises access to the service for its execution, based on said access rights for the second set of data.

The phase for subscribing to the service preferably includes payment for said service by the user via a payment server.

In one embodiment, the subscription phase further includes the furnishing of a one-time use password by the payment server to the user, the transmission of said password from the user terminal to the management server triggering the secure transmission of the container of said server to said terminal.

After the service has been executed, a step for updating the useful data of the container relating to the access rights to the service is advantageously implemented on the server, said updated data being backed up on the management server side.

According to one characteristic, following this update, the first and second sets of data of the container are encrypted on the server, then said updated container is transmitted securely from the management server to the user terminal for a subsequent service access phase.

The secure transmission of the container preferably consists in transmitting the constituent data of said container in encrypted form, via application of a symmetrical encryption algorithm using a secret key shared by the user terminal and the server.

The secret key used is preferably renewed per parameterable period.

According to one embodiment, the renewal of the secret key consists in transmitting a new key at the same time as the container, during its secure transmission from the server to the user terminal for a subsequent service access phase.

The symmetrical encryption algorithm used on the terminal side and server side is preferably of the RC4 type.

The encryption of the first and second sets of constituent data of the container, prior to their secure transmission, is preferably obtained via application of a public key algorithm to said data, the corresponding private key being stored only on the server.

According to one embodiment, the first set of authentication data is represented by hash function collisions.

According to this embodiment, the verification step on the server consists in ascertaining that the authentication data actually forms hash function collisions.

According to another embodiment, the verification step consists in verifying the correspondence of the authentication data coming from the container with authentication data referenced in a user database for this user.

An element for invoicing the cost of the service is preferably generated at the server level, after said service has been executed, using the useful data of the container relating to the access rights to the service for the user, the authentication data being associated with said invoicing element generated as proof that the access to said service has been authorised.

The invoicing element is advantageously stored with a view to being used for subsequent financial compensation.

According to one embodiment, the service accessed is a voice over IP service.

The transmission of the container from the user terminal to the server or from the server to the user terminal for accessing the service is advantageously integrated into a protocol enabling voice over IP transmissions, e.g., an SIP protocol.

According to an alternative, the transmission of the container from the user terminal to the management server, during a service access phase, is carried out by means of an intermediate network gateway, said gateway implementing a step for preliminary verification of the validity of the container, prior to it being routed to said server.

According to this alternative, the step for preliminary verification of the validity of the container consists in verifying the validity of a third set of authentication data of said container.

The invention further relates to a server connected to a data transmission network for accessing a service by means of a user terminal connected to said network, characterised in that it includes means for implementing the steps of the method as they have just been described.

Other characteristics and advantages of this invention will become more apparent upon reading the following description given for non-limiting and illustrative purposes and made with reference to the appended figures in which.

The invention thus relates to a method for accessing a service on a data transmission network. Access to the service is preferably carried out by means of a user terminal 30 connected to an access network AN, which, by means of a gateway GW, is connected to the data transmission network, typically the Internet network and in general with its connections to other autonomous networks, such as the public switched telephone network PSTN.

The access network can be either a local wireless network, e.g., a Wifi network, a public or private network operating under the IP protocol or under a protocol other than the IP, or a public or private switched telephone network.

Figure 1:
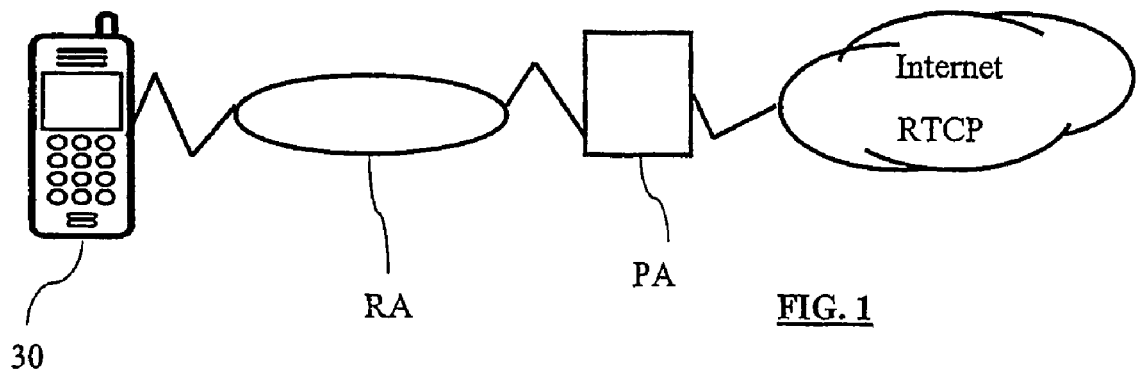
FIG. 1 is a schematic illustration of an exemplary network architecture in which the invention can be demonstrated.
Figure 2:
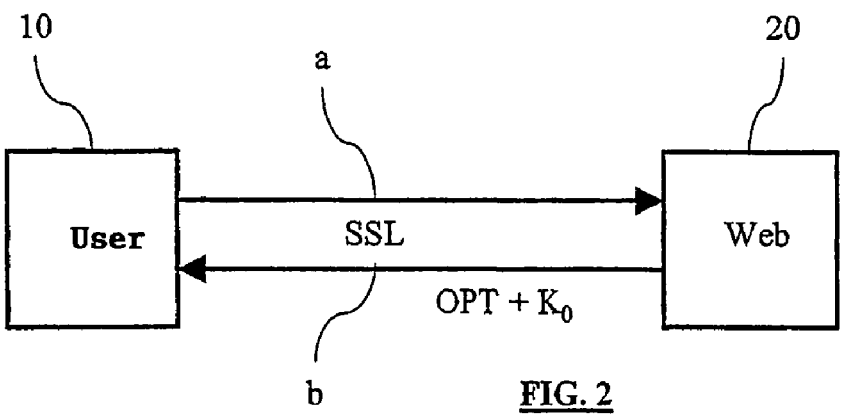
FIG. 2 shows, according to a preferred embodiment, the steps implemented during registration of a user with a service on a data transmission network.

The steps enabling a user 10 to subscribe to a service on the data transmission network are shown in reference to FIG. 2. For example, the service subscribed to by the user can be a telephony over IP service a videotelephony service or else a service for downloading digital files, e.g., MP3-type music files. Other types of multimedia services on the data transmission network can also be anticipated and proposed to the user who, in order to be able to access them, must subscribe to them in advance.

FIG. 2 shows clearly shows this subscription phase of the user to the service, which more specifically consists of an act of payment (a) on the part of the user to the payment server 20. In order to thereby subscribe to the desired service, the user can preferably carry out the transaction by means of their credit card, on a website provided for this purpose.

In return (b), the user obtains an activation number for the subscribed service. This activation number includes a one-time use password OTP, as well as a secret key $K_0$, the use of which will be explained later.

The transaction between the user and the payment server is preferably implemented according to a protocol enabling the secure transmission of information, such as the SSL protocol, for example.

However, it is appropriate to note that the activation number could be transmitted to the user by any other adequate means, e.g., by mail, by calling an interactive vocal response system or else by means of a scratch card.

The notion introduced here of a secure container will now be considered in the context of this invention. A secure container is an encrypted digital value representative of various information associated with a user subscribed to a service and, in particular with the access rights to this service. It enables this information to flow through various nodes of the network securely, without there being any need to provide for the implementation of an encrypted channel. The container further enables its owner, in this case a user terminal, to be authorised to access a service on the network based on the access rights to this service as they were defined when subscribing to the service, and which are stored in the secure container in digital format.

Figure 3:
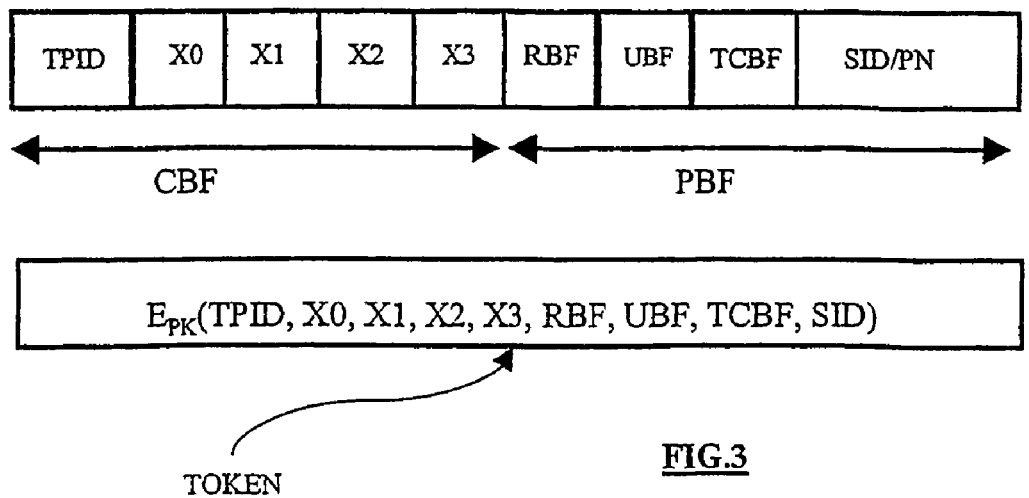
FIG. 3 shows a possible model for the structure of a secure container holding the information required for access to and execution of the service on the network.

FIG. 3 shows an exemplary secure container structure TOKEN, which is generated on a management server during the phase in which the user subscribes to the service. It includes a first set of CBF data forming the core of the container, substantially including authentication data for accessing the service $X0$, $X1$, $X2$ and $X3$, which constitute proof that access to the service in order to execute it can be authorised. According to one principle of the invention, the value and provenance of this first set of authentication data must be authentifiable and easily verifiable by the entity authorising the access, and this must be done in a secure manner.

A TPID field can thus be inserted into this first set of data, which is representative of the entity producing the container.

Additionally, according to one embodiment of the invention, the authentication data for accessing the service, referenced as $X0$, $X1$, $X2$ and $X3$ in the example of FIG. 3, is fabricated according to a method described in the article entitled "PayWord and Micromint—Two Simple Micropayment Schemes," by R. L. RIVEST and A. SHAMIR, and presented on 26 Jan. 1996 during the 1996 RSA Conference. This article describes a system for fabricating electronic coins, represented by bit strings whose validity can be verified by anyone, but which are very difficult to produce. In this system, the coins are represented by hash function collisions.

Thus, by taking up this principle, the authentication data for accessing the service, which is contained in the container, is itself represented by bit strings obtained via hash function collisions h, and it is possible to very easily verify the validity of this data by ascertaining that: $h(X0)=h(X1)=h(X2)=h(X3)$.

The container also includes a second set of useful PBF data, including data relating to the user of the service and to access rights to this service, which were defined at the moment the user subscribed to the service.

Thus, if the example of a subscribed telephony over IP service is assumed, an RBF field of the container includes data defining the terms of access to the services, e.g., by indicating if the user can make local and/or domestic and/or international calls. A UBF field includes valuable data associated with the service, making it possible to invoice, e.g., a number of units representative of the amount of the payment made by the user when they subscribed to the service. A TCBF field includes date/time data, e.g., data representative of a communication time. Other critical information might also be inserted into the second set of useful PBF data, e.g., such as an expiration date for the validity of the container.

The second set of useful data can also include an SID/PN field including data relating to the user, such as a subscriber identification number and/or their telephone number.

It is appropriate to note that the definition of the fields of the container relating to the useful data of the container, which make it possible to use the service for which the container was created, do not confer any restrictiveness upon this invention.

Thus, the first set of authentication data provides security and integrity functions for the second set of useful data and can be considered to be a unique, non-forgeable key making it possible to authenticate access to a given service.

Thus, by means of verifying the first set of authentication data, the container can guarantee that the access to a given service can be authorised, based on access rights defined in this container, and that the latter has already paid or that the user can be billed for this service.

Once the first set of CBF data and the second set of PBF data of the container have been generated, these first and second sets of data are encrypted via application of a public key encryption algorithm $E_{PK}$, e.g., an RSA-type algorithm. In this way, the secure container TOKEN is obtained.

Provision is made for this container thus secured to be stored on the user terminal side, in order to enable implementation of a service access phase from this terminal, which will be implemented via a gateway GW of the data transmission network, typically the management server. The private key, which corresponds to the public key used within the framework of the RSA algorithm for encrypting the constituent data of the container, is stored only on the server.

In this way, the fields of the container can be modified only on the management server side, and the user terminal will not be able to gain access to the constituent data in clear of the container.

The data transmission network must include, at the level of each management service involved in a phase in which the user terminal accesses the service, a data processing system programmed so as to carry out the various steps of the method of the invention. This data processing system can be customized as a separate system from the computer system managing the server, or be integrated into the computer system via the addition of integrated software.

Figure 4:
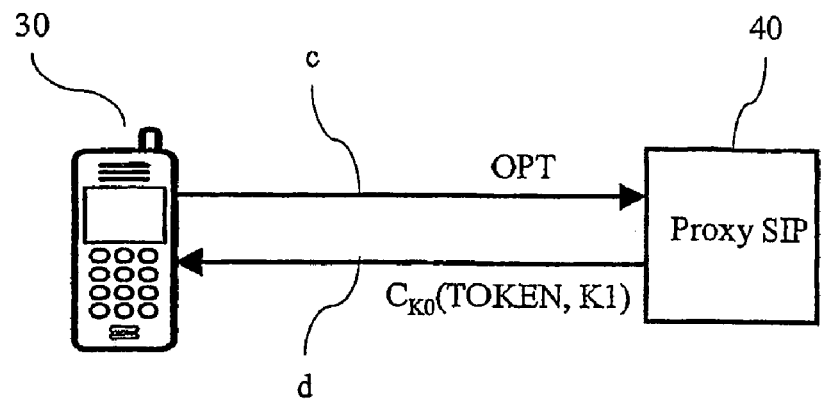
FIG. 4 shows steps for obtaining the secure container via the terminal, following subscription to the service for access thereto.

Thus, in order to be able to implement a service access phase, the secure container must first be stored on the user terminal side. This step is described in reference to FIG. 4, which shows a secure exchange of the container TOKEN, between a user terminal 30 and a management server 40 of the data transmission network, which is provided to ensure the distribution of the containers over the terminals, the verification of these containers and their validation, in order to authorise access to and the execution of a given service. The implementation of these steps will be described in greater detail below.

Still according to the example wherein the service subscribed to by the user is a telephony over IP service, the server 40 is a server positioned in the network in the presence of a voice over IP VoIP infrastructure and that will transmit all of the call signalling packets to the next VoIP device of this infrastructure, once the information from a container TOKEN received from a terminal or, according to an alternative, from another node of the network, has been retrieved and verified within the framework of a request for access to the VoIP service, as will be explained further on. The server 40, for example, is a SIP proxy type server ("Session Initiation Protocol").

Thus, according to the alternative introduced above, the container and its use within a data transmission network for authenticating access to a given service, as disclosed in this description, can also be implemented within the framework of a communication protocol between two nodes of the network involved in the access to the service, e.g., between two SIP proxy type servers.

Prior to the phase for accessing the service by means of the user terminal 30, a step c for transmitting the password OTP from the user terminal 30 to the management server 40 is implemented, triggering the secure transmission in step d, from the server 40 to the terminal 30, of the container TOKEN, which is itself already secured by the RSA-type heavy encryption.

The secure transmission of the container TOKEN over the network is advantageously ensured by the application of a symmetrical encryption algorithm $C_{KO}$, e.g., of the RC4 type, using the secret key $K_0$ previously furnished to the user and shared by the management server.

Two types of encryption are then applied on the container. On the one hand, the first set of data of the CBF container is linked securely to the second set of PBF data by an RSA-type heavy encryption managed on the server. On the other hand, the container benefits from a second level of lighter, RC4-type encryption for its secure transmission across the network. As will become apparent further on, this latter type of encryption is provided in order to be implemented on both the server side and the terminal side, so as to provide anti-replay properties to the secure container.

The secret keys used in the secure transmissions of the container over the network are changed very frequently so as to further strengthen the security, taking into account the light encryption algorithm used.

The secret keys used are thus renewed per parameterable period. Thus, renewal of the secret key $K_0$ is carried out by transmitting a new key K1 at the same time as the container TOKEN, during its secure transmission from the server 40 to the user terminal 30. The server 40 thus sends $C_{k0}$ (TOKEN, K1) to the terminal 30.

Upon receipt, the terminal 30 decrypts the value received using the secret key $K_0$ that it already possesses, and thereby retrieves the value of the still RSA-encrypted container TOKEN, and the secret key K1.

Figure 5:
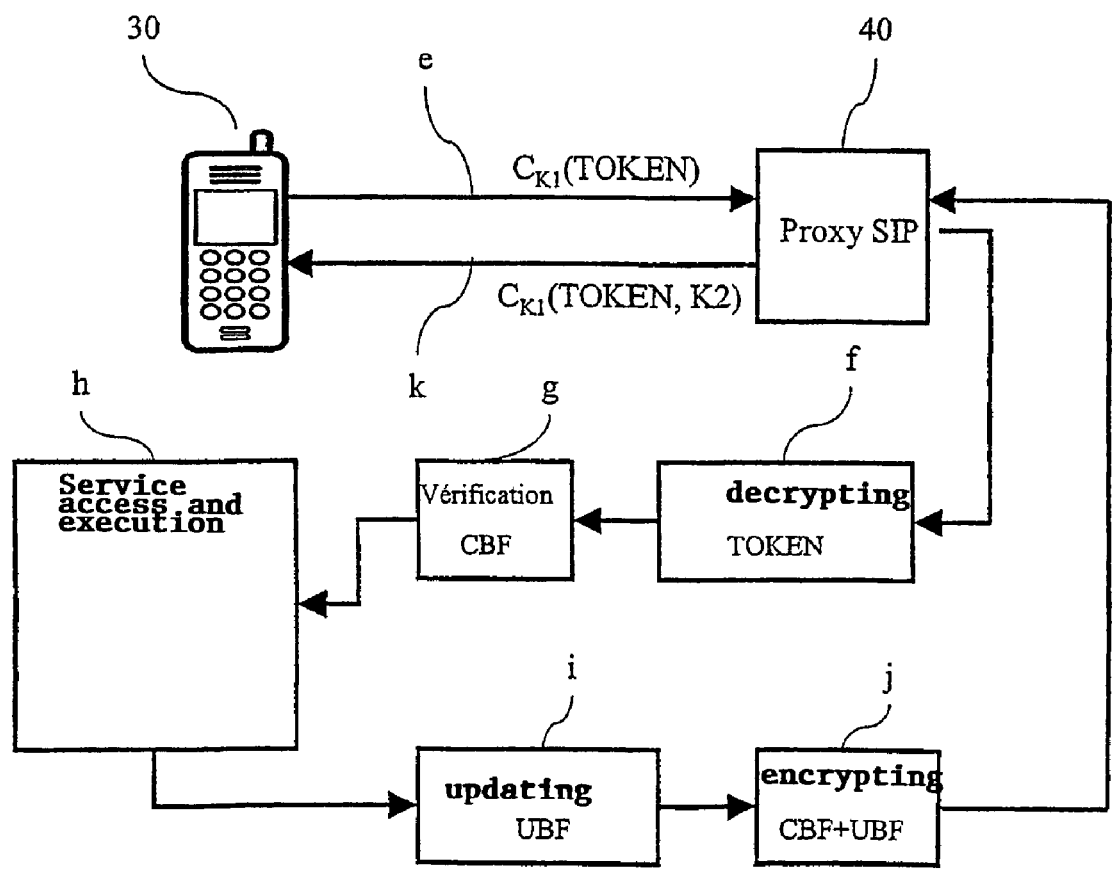
FIG. 5 is a block diagram showing a series of steps implemented on the server during access to the service.

With reference to FIG. 5, in order to implement a phase for accessing the subscribed service, a service access request sent by the terminal 30 consists in transmitting the secure container $C_{K1}$ (TOKEN), at (e), to the server 40, via application of the RC4 algorithm on the container, using the secret key K1.

Taking into account the RC4-type light encryption scheme chosen for the secure transmission of the container, the steps of the method can advantageously be implemented on user terminals having few available CPU resources. Furthermore, since the heavy security operations for the container are primarily managed on the management server side, in particular the RSA encryption of the constituent data of the container, the client side implementation on the user terminal requires only a single application capable of ensuring secure storage of the container on the terminal and the implementation of the RC4 encryption, intended for the secure transmission of the container.

Upon receipt of the RC4-encrypted container $C_{k1}$ (TOKEN) on the management server side 40, the series of steps f to k is implemented.

In step f, the server carries out an operation for decrypting the data received from the terminal. It first decrypts $C_{K1}$ (TOKEN) using the secret key K1, so as to retrieve the container TOKEN, whose data is RSA-encrypted. Then, in a second phase, it retrieves the first set of CBF authentication data and the second set of useful UBF data of the container via the RSA decryption operation using the corresponding private key of which it is the sole possessor.

Once the data of the container has been retrieved in clear, a step for verifying the validity of the first set of authentication data X0, X1, X2, X3 is implemented. This step can simply consist in ascertaining that the authentication data X0, X1, X2, X3 actually forms hash function collisions.

In the event that verification is successful, the server 40 authorises access to the service for its execution based on the access rights to this service referenced in the second set of useful data of the container. For example, the service accessed can be an SIP call to an international number, authorised in accordance with the RBF/UBF/TCBF values, the signalling packets for this call then being transmitted by the server to the VoIP infrastructure.

The properties of the container used thus bring a great degree of flexibility to managing access to telephony over IP service, particularly as concerns the problematics of "roaming." Thanks to this container, it is not necessary to return to a centralised database in order to identify the user. The access rights of the user for accessing the service can in fact be verified directly from the container, without having to return to a user account defining these rights.

During step g, the server 40 can, however, call on a user database. Verification can thus consist in verifying the correspondence of the authentication data for the transaction derived from the container with the authentication data referenced in a user database for this user. In an alternative, the authentication data for access to the service can in fact consist of a digitized fingerprint of the user, having the same guarantees of security as the use of hash function collisions.

The server can also verify, in the user database, whether the useful RBF, UBF and TCBF data derived from the container actually corresponds to the current useful data for accessing the service, which is stored for this user in the database.

After execution of the service, a step i is implemented for updating the useful data of the container, relating to the access rights to the service, in particular a step for updating the RBF, UBF and TCBF data. For example, if a prepaid period of 500 minutes had been subscribed to by the user, then, at the end of a 7-minute call session, the initial value of 500 for the TCBF field of the useful data of the container is reduced by 7. The updated useful data is then backed up in the user database on the management server side.

During this step, an element for invoicing the cost of the service can possibly be generated and stored at the server 40 level, the content of which is determined from the useful data of the container relating to the access rights to the service for the user. For example, for reach access to the VoIP service, the variations of the TBCP data, providing the communication time, and the UBF data for the cost of one unit of communication, can be stored in order to produce the invoicing element. The authentication data is also associated with the invoicing element generated as proof that access to the service has indeed been authorised. The invoicing element thus stored on the server 40 can then be later used with a third-party organisation in order to obtain financial compensation on the basis of the gathered data.

Following the step for updating the useful data of the container, a step is implemented for RSA decryption of the first set of CBF authentication data and the second set of useful PBF data along with the updated data. In this way, the secure, updated container is obtained.

Finally, in step k, the secure, updated container is transmitted securely to the user terminal 30 for a subsequent service access phase, the secure transmission being ensured, as explained previously, via the application of the RC4 algorithm with K1. Renewal of the secret key K1 is possibly carried out during this step, by transmitting a new key K2, which will be used during the subsequent service access phase. The new secret key K2 is transmitted at the same time as the updated container TOKEN, during the secure transmission from the server 40 to the user terminal 30. The server 40 thus sends $C_{k1}$ (TOKEN, K2) to the terminal 30.

The secure transmission of the container TOKEN, whose data is already encrypted, from the user terminal 30 to the management server 40, or else between two network servers, in order to implement the access to and execution of the service, is provided in order to be integrated into a protocol enabling voice over IP transmissions, e.g., the SIP protocol, according to the exemplary embodiment described with reference to a subscribed VoIP service. In order to insert the container into a data packet according to the selected protocol, it is necessary to define a heading, so as to enable adequate processing, according to the invention, of the container-holding packets. This heading, for example, may consist of several fields, such as the size of the data, a control number, a session identifier or other control information.

According to an alternative, the information container TOKEN can include a third set of authentication data, the role of which will be described below.

Thus, according to this variant, an intermediate network gateway is implemented in order to carry out the transmission of the container from the user terminal to the management server during a phase for accessing a service on the network. The intermediate gateway is then provided for carrying out a preliminary verification of the validity of the container, prior to routing it to the management server, which consists in verifying the validity of the third set of authentication data of the container.

The third set of authentication data can be represented by bit strings obtained via hash function collisions, in the same way as for the first set of data of the container.

The third set of data of the container can also be encrypted using a RC4-type, symmetric-key encryption algorithm.

The invention claimed is:

1. A method of accessing a service, via a data transmission network, using a user terminal (30) connected to said network, comprising:

a step of the user connecting the user terminal (30) to an access network (AN), the access network, via a gateway (GW), being connected to the data transmission network, a management server being located on the data transmission network, wherein the access network is one of i) a local wireless network, ii) a public network, iii) a private network, iv) a public switched one network, and v) a private switched telephone network;

a step of the user subscribing to the service, including the management server generating a secure information container (TOKEN) associated with the user, the secure information container including i) a first encrypted set of authentication data (X0, X1, X2, X3) for accessing the service, and ii) a second encrypted set of data identifying the user (SID/PN) and defining access rights of the user to said service (RBF, UBF, TBF), said information container itself being encrypted prior to secure transmission so that the secure information container is an encrypted digital value of the first encrypted set of authentication data and the second encrypted set of data, said subscribing step further includes an act of payment (a) by the user to a payment server (20), and in return (b) to the payment (a), the user obtaining an activation for the subscribed service, the activation including a one-time use password (OTP) and a secret key, the user terminal transmitting the one time password and the secret key to the management server in order to receive the information container from the management server, the secret key being used by the management server to encrypt the information container, and the information container comprising i) the first set authentication data for accessing the service (X0, X1, X2, X3) constituting proof that the user's access to the service is authorized, a value and a provenance of the authentication data being authentifiable and verifiable by the management server, the authentication data comprises a field representative of the management server producing the container, and electronic coins comprising bit strings having validity that can be verified, the electronic coins being represented by hash function collisions, and ii) the second set data comprising at least one of a subscriber identification number and a telephone number of the user;

a step of the management server transmitting the secure information container, over the data transmission network, to the user terminal (d);

a step of the user terminal receiving the transmitted secure information container and storing the secure information container in the user terminal;

a step of accessing the subscribed service by sending a service access request from the user terminal to the management server (e), the service access request comprising the secure information container;

a step of receiving said service access request by the management server and the management server decrypting the secure information container using the secret key, then decrypting the first and second sets of data (f);

a step of the management server verifying validity of the decrypted first set of data (g); and when said validity verification step is successful, a step of the management server authorizing access by the user to the service based on said defined access rights contained in the second set of data, wherein the service refers to any exchange of information, via a digital data transmission network or via a telecommunication data transmission network, between i) the user and another user, or ii) between the user and a service provider, wherein, with the method providing a secured authentication, the method accesses services requiring a secure exchange of information including any of i) a telephony over IP service, ii) a videotelephony service, iii) a service for downloading digital files, and iv) a payment service.

2. The method of claim 1, wherein, with the method providing a secured authentication, the method accesses services requiring a secure exchange of information including any of i) a telephony over IP service, ii) a videotelephony service, and iii) a service for downloading digital files.

3. A method of accessing a service, via a data transmission network, using a user terminal connected to said network, comprising:

a step of the user connecting the user terminal to an access network, the access network, via a gateway, being connected to the data transmission network, a management server being located on the data transmission network;

a step of the user subscribing to the service, including the management server generating a secure information container associated with the user, the secure information container including i) a first encrypted set of authentication data for accessing the service, and ii) a second encrypted set of data identifying the user and defining access rights of the user to said service, said information container itself being encrypted prior to secure transmission so that the secure information container is an encrypted digital value of the first encrypted set of authentication data and the second encrypted set of data, the information container comprises i) the first set authentication data for accessing the service constituting proof that the user's access to the service is authorized, a value and a provenance of the authentication data being authentifiable and verifiable by the management server, the authentication data comprises a field representative of the management server producing the container, and ii) the second set data comprising at least a subscriber identification number;

a step of the management server transmitting the secure information container, over the data transmission network, to the user terminal;

a step of the user terminal receiving the transmitted secure information container and storing the secure information container in the user terminal;

a step of accessing the subscribed service by sending a service access request from the user terminal to the management server, the service access request comprising the secure information container;

a step of receiving said service access request by the management server and the management server decrypting the first and second sets of data;

a step of the management server verifying validity of the decrypted first set of data; and when said validity verification step is successful, a step of the management server authorizing access by the user to the service based on said defined access rights contained in the second set of data, wherein the service refers to any exchange of information requiring strong authentication and a high level of security, via the data transmission network, i) between the user and another user, or ii) between the user and a service provider.

4. The method of claim 3, wherein, the access network is one of i) a local wireless network, ii) a public network, iii) a private network, iv) a public switched one network, and v) a private switched telephone network.

5. The method of claim 3, wherein, said subscribing step further includes an act of payment (a) by the user to a payment server, and in return (b) to the payment (a), the user obtaining an activation for the subscribed service.

6. The method of claim 5, wherein, the activation including a one-time use password and a secret key, the user terminal transmitting the one time password and the secret key to the management server in order to receive the information container from the management server, the secret key being used by the management server to encrypt the information container.

7. The method of claim 3, wherein, the authentication data of the first set authentication data further comprises electronic coins comprising bit strings having validity that can be verified.

8. The method of claim 7, wherein, the electronic coins are represented by hash function collisions.

9. The method of claim 3, wherein, the second set data further comprises a telephone number of the user.

10. The method of claim 6, wherein, the management server decrypts the secure information container using the secret key.

11. The method of claim 3, wherein, the data transmission network is a digital data transmission network or a telecommunication data transmission network.

12. The method of claim 3, wherein, with the method providing a strong authentication and a high level of security, the method adapted to the access to services requiring highly secured exchange of information in one of i) a telephony over IP service, ii) a videotelephony service, and iii) a service for downloading digital files.

13. The method of claim 3, wherein, with the method providing a strong authentication and a high level of security, the method adapted to the access to services requiring highly secured exchange of information in one of i) a telephony over IP service, ii) a videotelephony service, iii) a service for downloading digital files, and especially iv) a payment service.

* * * * *

UNITED STATES PATENT AND TRADEMARK OFFICE
CERTIFICATE OF CORRECTION

PATENT NO.        : 8,359,273 B2
APPLICATION NO.   : 11/659836
DATED             : January 22, 2013
INVENTOR(S)       : Jean-luc Leleu It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1557 days.

Signed and Sealed this
First Day of September, 2015

Michelle K. Lee
*Director of the United States Patent and Trademark Office*